United States Patent [19]

Stanciu

[11] 4,139,046
[45] Feb. 13, 1979

[54] TURBINE WHEEL PATTERN AND METHOD OF MAKING SAME

[75] Inventor: Virgil V. Stanciu, Rocky River, Ohio

[73] Assignee: Tempcraft Tool & Mold, Inc., Cleveland, Ohio

[21] Appl. No.: 818,966

[22] Filed: Jul. 25, 1977

Related U.S. Application Data

[63] Continuation-in-part of Ser. No. 679,220, Apr. 27, 1976, abandoned.

[51] Int. Cl.$^2$ ............................................. B22C 7/02
[52] U.S. Cl. ..................................... 164/45; 164/246; 164/249
[58] Field of Search ..................................... 164/19–21, 164/23–27, 34–35, 45, 249

[56] References Cited

U.S. PATENT DOCUMENTS

| | | | |
|---|---|---|---|
| 3,041,689 | 7/1962 | Peras | 164/35 |
| 3,669,177 | 6/1972 | Ingalls et al. | 164/34 |
| 3,848,654 | 11/1974 | Boyle et al. | 164/249 |

FOREIGN PATENT DOCUMENTS 952284  8/1974  Canada ..................................... 164/27

Primary Examiner—Richard B. Lazarus
Assistant Examiner—John McQuade
Attorney, Agent, or Firm—Baldwin, Egan, Walling & Fetzer

[57] ABSTRACT

A method is presented to make an investment casting pattern of a rotatable turbine wheel or a stationary turbine nozzle wheel having one continuous and regular series of blades extending around its periphery with a uniform pitch between blades and in which all such blades are bent in one circumferential direction and adjacent blades overlap each other in a circumferential direction so that the wheel pattern cannot be made in a simple two part mold separating at right angles to a parting line. The method comprises separately forming two wheel pattern portions of the same diameter as the finished turbine wheel pattern, each having a series of continuous and regular blades around its periphery with a uniform pitch between the blades which is exactly twice the pitch of the blades in the finished wheel pattern. In such a pattern wheel portion the adjacent blades do not overlap each other. Two such pattern wheel portions are then assembled so that the blades of the two portions form the one continuous and regular series of blades which comprises the pattern of the complete turbine wheel.

5 Claims, 10 Drawing Figures

TURBINE WHEEL PATTERN AND METHOD OF MAKING SAME

This application is a continuation-in-part of my copending application Ser. No. 679,220, filed Apr. 27, 1976, now abandoned.

BACKGROUND OF THE INVENTION

A typical rotating turbine wheel consists of a central hub and a series of airfoil blades projecting radially from the hub. In the case of a metal turbine wheel, one of the manufacturing techniques used is the investment casting process which requires a preformed pattern of wax or any other suitable material. In cases where metal cores cannot be separated from the pattern due to backlock, the pattern is produced by making individual blade portions which are fused together in elaborate assembly fixtures. An inherent disadvantage of this method is the amount of time required to mold the blades separately, and to assemble and bond them together in a wheel. In addition, elaborate assembly fixtures are necessary to produce an assembled wheel that is within acceptable tolerance specifications.

Another method to produce wax patterns for such a turbine wheel is by using individual soluble wax inserts in a die where the wax is injected and the solubles are removed by dissolving them in a suitable solvent. This method has the disadvantage of (1) the time required to inject the soluble inserts, (2) the loss of the soluble material after it is dissolved, and (3) the inaccuracy of the soluble inserts resulting from shrinkage and distortion during the molding process of the soluble inserts.

An object of this invention is to eliminate the necessity of producing and assembling individual airfoil portions or segments for production of investment casting patterns of the sort described. This is done by making a two-piece hub and blade complex which is split approximately through the axial center of the complex. The airfoil blades may be an integral part of the hub, with every other blade appearing on each half of the complex. The two hub halves are then meshed together and fused to form a complete wheel pattern with exact spacing of adjacent blades which, as mentioned above, might overlap each other in a circumferential direction.

It will be made apparent in this specification that it is much more economical to mold two halves and bond them together than it is to mold a plurality of blades and use a sophisticated assembly fixture for positioning and bonding them together. For example, a forty blade turbine wheel would require forty separate blades as opposed to using this invention which requires only two halves, each containing twenty blades.

It will also be obvious from the following specification that this invention is applicable to other turbine wheels that are not necessarily made out of metal but are manufactured by the investment casting process. For example, such process may be applicable to manufacture turbine wheels made from ceramic materials.

Other objects and advantages of this invention will be apparent from the accompanying specification and drawings and the essential features thereof will be set forth in the appended claims.

Investment casting is an industrial process by which intricate and precise metal castings are produced. The process consists of the following basic steps:

1. Wax, meltable plastic or any other suitable pattern material is injected into a die to make a pattern, complete as in FIGS. 1 and 6.
2. One or more patterns are gated to a central sprue to form a cluster.
3. Pattern clusters are dipped in a ceramic slurry.
4. Refractory grain is sifted onto coated patterns and dried. Steps 3 and 4 are repeated several times using progressively coarser grains of ceramic material to reach the desired shell thickness.
5. After the mold material has set and dried, patterns are completed out of the mold by melting out the wax, plastic, or any other suitable pattern material.
6. Hot moldings are filled with metal by gravity, pressure, vacuum or centrifugal force.
7. Mold material is broken away from the casting.
8. Castings are removed from the sprue, and gate stubs are ground off.

The turbine wheel pattern used in this invention is defined as wax, meltable plastic, or any other suitable pattern material which consists of two half-patterns, each of which is formed in a standard die which opens on opposite sides of a parting line, after which said two half-portion patterns are removed from the respective dies and joined together as taught herein to form the complete wheel pattern as described in step No. 1 above.

Figure 1:
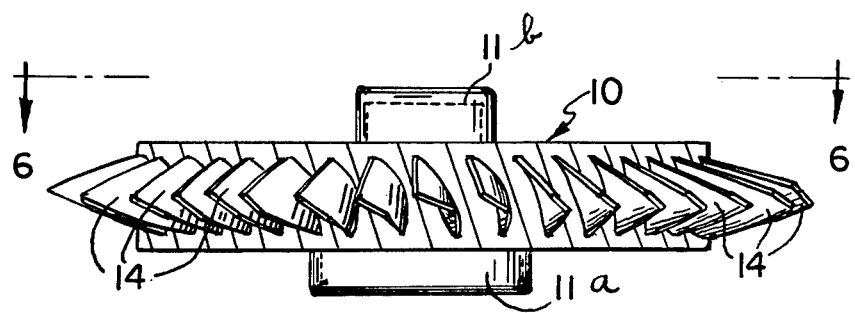
FIG. 1 is a side elevational view of a complete turbine wheel pattern made according to this invention.
Figure 5:
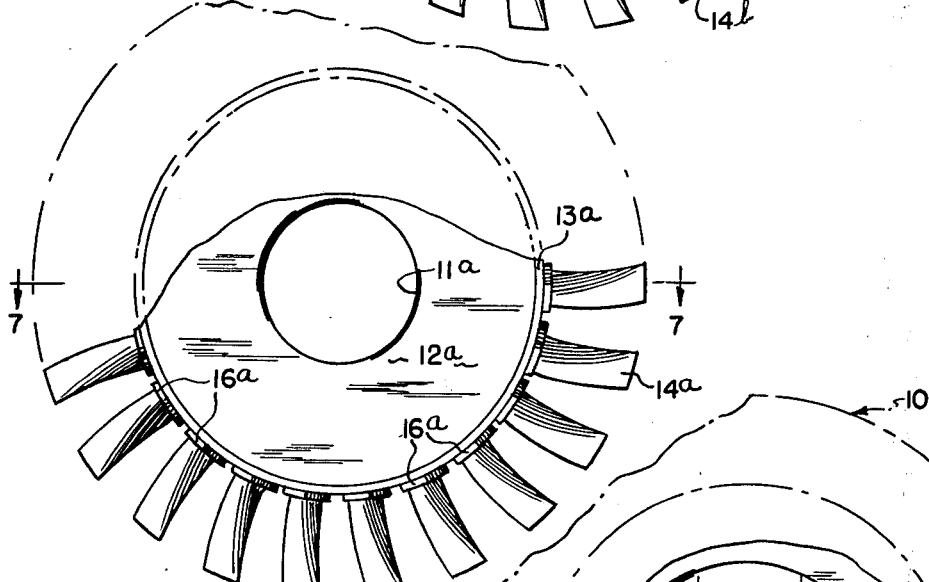
FIG. 5 is a top plan view of the wheel pattern portion shown in FIG. 3 taken along the line 5—5.
Figure 6:
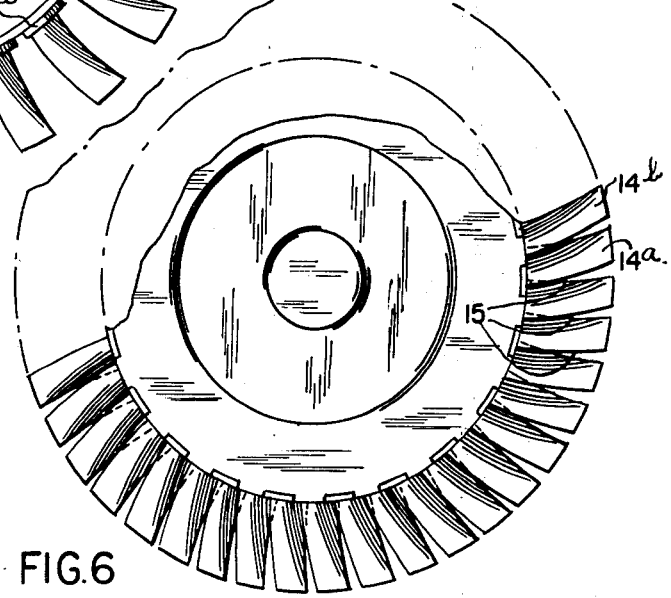
FIG. 6 is a top plan view of a completed turbine wheel pattern taken along line 6—6 of FIG. 1 made by combining the two half wheels made according to the patterns of FIGS. 2 and 3.

Referring now to the drawings, there is shown a pattern made out of wax from which one may form a metal turbine wheel by investment casting. FIGS. 1 and 6 show a complete turbine wheel pattern 10 having hub portions 11a and 11b and integral wheel portions 12a in FIG. 5 and 12b in FIG. 4 which extend radially outward from the hub and are joined integrally with rim portions 13a and 13b shown respectively in FIGS. 5 and 4. The complete wheel 10 has one continuous and regular series of blades 14 extending around its periphery with a uniform pitch between the blades and in which all blades are bent in one circumferential direction and adjacent blades overlap each other in a circumferential direction as indicated at 15 as indicated in FIG. 6.

Figure 2:
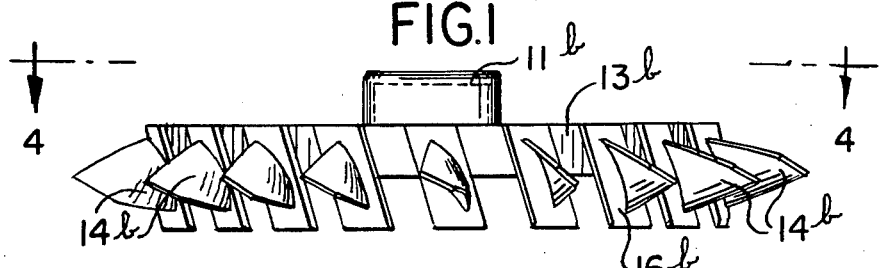
FIG. 2 is a side elevational view of one half of the turbine wheel pattern shown in FIG. 1 when constructed according to this invention.
Figure 3:
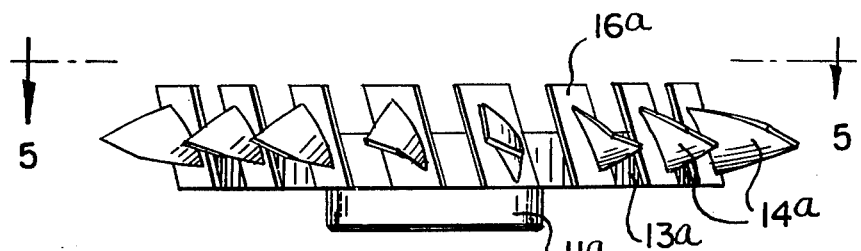
FIG. 3 is an elevational view of the other half of the turbine wheel pattern of FIG. 1 constructed according to this invention.

The complete wheel pattern is divided, as shown in this invention, into two separate wheel portion patterns as shown in FIGS. 2, 3, 4 and 5 by dividing the wheel pattern approximately half way between the two hub portions 11a and 11b and then each of the half wheel portion patterns as shown in FIGS. 2 and 3 are molded separately but in almost identical manners.

Figure 4:
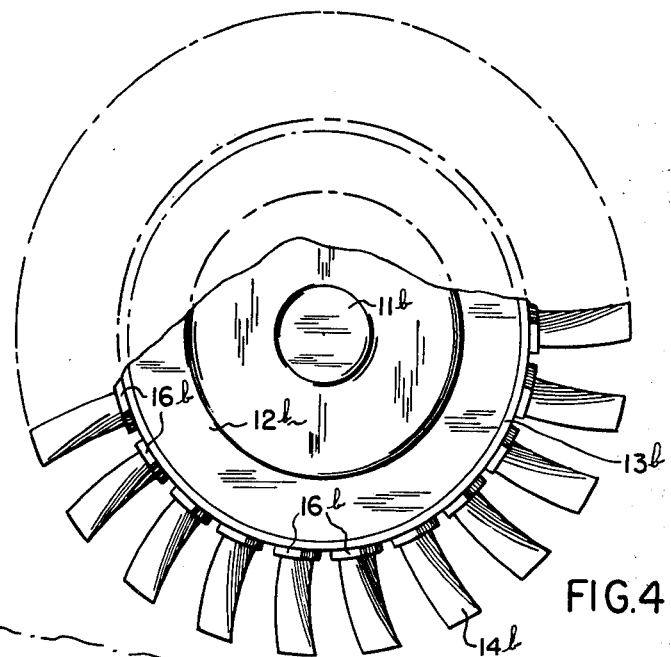
FIG. 4 is a top plan view of the wheel pattern portion shown in FIG. 2 taken along the line 4—4.

Referring to FIG. 2, as well as FIG. 4, these wheel portion patterns have diameters the same as the rim portions 13b (and 13a in FIG. 3) as the completed wheel 10. In each of the half wheel portion patterns of FIGS. 2 and 3, there is a continuous regular series of blades 14a and 14b around its periphery with a uniform pitch between the blades which is exactly twice the pitch in the completed wheel pattern 10 of FIG. 1. Complementary means is provided on the two wheel portion patterns of FIG. 2 and FIG. 3 indicating a mutual registering position between the two wheel portion patterns where the blades of the two portions will be arranged in exactly the interfitting arrangement shown in FIG. 1 and with the necessary uniform pitch between the blades as seen in FIG. 1. In some cases this may be a raised spot on one of the wheel portion patterns which must match with a recess in the other wheel portion pattern when the two wheel half portions are put together, that is, moved toward each other from the position shown in FIGS. 2 and 3 until the parts interfit as shown in FIG. 1 to form the complete wheel pattern. However, in this embodiment each blade 14a and 14b has a root portion 16a and 16b which is integral with its associated rim portion and which is a regular trapezoid inclined at an angle of about 15 degrees, to the vertical as seen in FIGS. 2 and 3, and each root portion having a total length of about twice the width of the rim 13a or 13b so that when they are put together as in FIG. 1 the blades 14a and 14b are so arranged on the root portions that they make a continuous regular series of blades all in the same horizontal zone as viewed in FIG. 1. Also, the inclined arrangement of the parallel sides of the root portions 16a and 16b at least partially interlock as they are put together from the position of FIGS. 2 and 3 to the position of FIG. 1.

Figure 7:
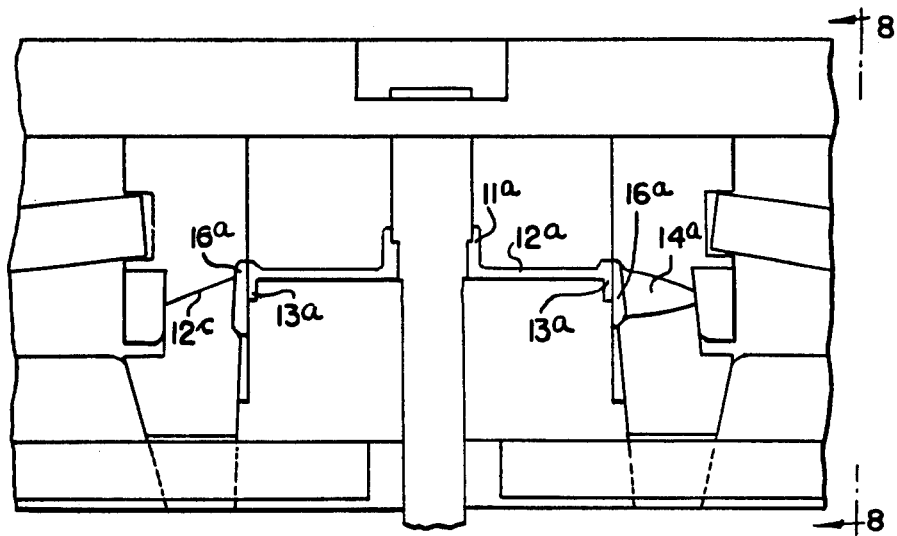
FIG. 7 is a sectional view through a known type of mold which may be used to form the wheel pattern portion of FIG. 3 and with slight modification to form the wheel pattern portion of FIG. 2.
Figure 8:
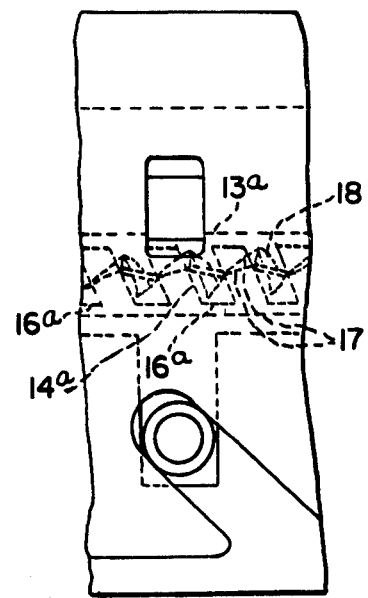
FIG. 8 is an elevational view of the mold form by which is provided a pattern entirely around the circumference of the rim portion of the wheel pattern formed according to FIG. 7 taken along the line 8—8 as shown.

The die form for making the wheel portion pattern of FIG. 3 is shown in FIGS. 7 and 8. FIG. 7 shows the central portion of the wheel pattern including the hub portion 11a, the wheel portion 12a and the rim portion 13a. This part of the die is of standard well known construction. The blade portions 14a, together with the integral root portions 16a, are formed by the die structure shown in FIG. 8. The root portions 16a, and 16b of FIG. 2, are formed integral with their associated blades 14a, as shown in FIG. 8 and integral with the rim 13a, wheel 12a, and hub 11a as shown in FIG. 7. The parting lines where the die portions of FIG. 8 separate are indicated in broken lines at 17 and 18, and at 12c in FIG. 7. The die form for making the wheel portion patterns of FIG. 2 would be of the same concept and construction as described above for FIG. 3.

The pattern just described as being made out of wax for use in investment casting of a metal turbine wheel could be used with very little change to make a pattern out of suitable material for casting a metal turbine wheel, or for forming a turbine wheel out of suitable ceramic material. In any case, where the turbine wheel involves overlapping portions of blades which would prevent the formation of the structure in a pattern having two parts which move away from each other in a direction normal to the parting line, the division of the wheel pattern into two half wheel portion patterns as herein described renders it possible to make such half portions in well known investment casting molding operations so as to greatly simplify the assembly of the finished turbine wheel from two pattern parts instead of many parts.

Figure 9:
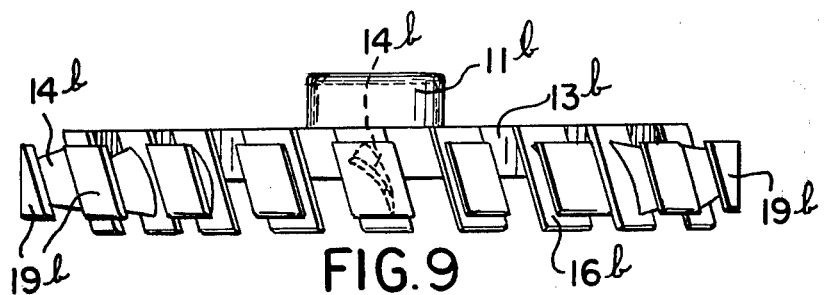
FIGS. 9 and 10 are side elevational views similar to FIGS. 2 and 3 but showing a shrouded turbine wheel pattern, or a turbine nozzle wheel pattern which includes a circular shroud interconnecting the radially outer ends of the blades.
Figure 10:
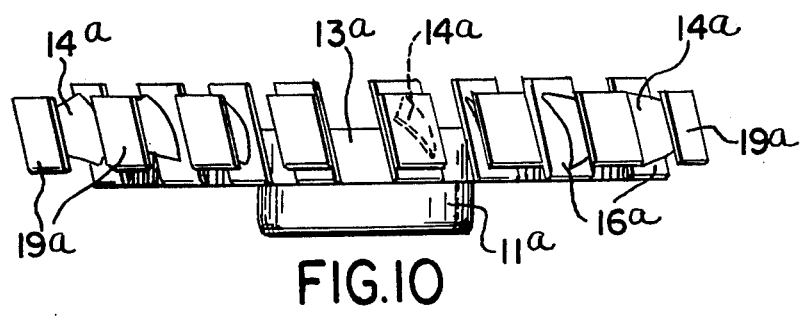

The same method as described herein could be utilized to form a pattern for a shrouded turbine wheel and/or a turbine nozzle wheel having an outer shroud connecting the radially outer ends of the blades as shown in FIGS. 9 and 10. Here the portions 11a, 11b, 12a, 12b, 13a, blades 14a and 14b, and root portions 16a and 16b are all like those described in connection with FIGS. 1, 2, and 3. The difference is that outer shroud portions 19a and 19b are integrally formed with the associated blades 14a and 14b arranged in circular form so that the shroud portions 19a fit closely between the shroud portions 19b when the two half wheel patterns are put together which forms a pattern for a complete circular outer shroud around the outer ends of the vanes 14a and 14b.

I claim:

1. The method of forming an investment casting finished wheel pattern of suitable pattern material for a turbine wheel, having one continuous and regular series of blades extending around its periphery with a uniform pitch between blades; in which all said blades are bent in one circumferential direction and adjacent blades overlap each other in a circumferential direction, comprising separately forming two pattern wheel portions, each portion of the same diameter as said finished wheel pattern and each of said pattern wheel portions having every other blade of said continuous and regular series of blades around its periphery with a uniform pitch between blades, which is exactly twice said first named pitch, in which adjacent blades do not overlap each other; there being complementary means on said two pattern wheel portions indicating a mutual registering position between them whereby to exactly arrange said blades of said two pattern wheel portions with the blades of one pattern wheel portion between the blades of the other pattern wheel portion in said finished wheel pattern having one continuous and regular series of said blades around its periphery and all blades bent in the same direction around said periphery in said first named uniform pitch; so arranging said two pattern wheel portions and securing said two pattern wheel portions together and fixed in said mutual position.

2. A turbine wheel pattern, having one continuous and regular series of blades extending around its periphery with a uniform pitch between blades; in which all said blades are bent in one circumferential direction and adjacent blades overlap each other in a circumferential direction; said wheel pattern consisting of two pattern wheel portions of, each of the diameter of said turbine wheel pattern, and each portion having a continuous and regular series of blades around its periphery with a uniform pitch between said blades which is exactly twice said first named pitch, there being complementary means on said two pattern wheel portions indicating a mutual position between them where said blades of one of said pattern wheel portions are between the blades of the other of said pattern wheel portions so as to position said blades of said two pattern wheel portions in said one continuous and regular series of said blades and all blades bent in the same direction around said periphery in said first named uniform pitch; and means securing said two wheel portion patterns fixed in said mutual position.

3. A turbine wheel pattern as defined in claim 2, wherein each of said pattern wheel portions has central hub portions integrally joined with said blades.

4. A turbine wheel pattern as defined in claim 2, wherein each of said blades has an integral root portion, each said wheel pattern portion has a circular rim, said root portions conform to the surface of the radially outer face of said rim, and each of said root portions has a circumferential width equal to said pitch, whereby said pattern wheel portions are assembled with said root portions snugly interfitting thereby providing said complementary means indicating said mutual position.

5. A turbine wheel pattern as defined in claim 4, wherein said root portions have parallel sides inclined at an angle to the axis of said turbine wheel pattern whereby they firmly interlock.

* * * * *